United States Patent
Shaliv et al.

(10) Patent No.: US 10,187,385 B2
(45) Date of Patent: Jan. 22, 2019

(54) TECHNIQUES FOR EXTENDING COMMUNICATIONS CHAIN OF TRUST TO CLIENT APPLICATIONS

(71) Applicant: INTEL CORPORATION, Santa Clara, CA (US)

(72) Inventors: Adi Shaliv, Nir-Banim (IL); Jesse Walker, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/369,219

(22) PCT Filed: Nov. 26, 2013

(86) PCT No.: PCT/US2013/071902
§ 371 (c)(1),
(2) Date: Jun. 27, 2014

(87) PCT Pub. No.: WO2015/080698
PCT Pub. Date: Jun. 4, 2015

(65) Prior Publication Data
US 2015/0358320 A1 Dec. 10, 2015

(51) Int. Cl.
*H04L 29/06* (2006.01)
*G06F 21/44* (2013.01)
*H04L 9/32* (2006.01)

(52) U.S. Cl.
CPC ........ *H04L 63/0869* (2013.01); *G06F 21/445* (2013.01); *H04L 9/3223* (2013.01); *H04L 9/3247* (2013.01); *H04L 9/3273* (2013.01); *H04L 63/0823* (2013.01); *H04L 63/12* (2013.01); *G06F 2221/2119* (2013.01); *H04L 63/045* (2013.01); *H04L 63/166* (2013.01)

(58) Field of Classification Search
CPC .... H04L 63/12; H04L 63/0869; G06F 21/445
USPC ............................................ 713/193; 726/17
See application file for complete search history.

(56) References Cited

U.S. PATENT DOCUMENTS

| 8,670,563 B2 | 3/2014 | Natarajan |
| 2001/0050990 A1* | 12/2001 | Sudia ............... G06Q 20/02 380/286 |

(Continued)

OTHER PUBLICATIONS

International Search Report and Written Opinion for PCT Patent Application No. PCT/US2013/071902, dated Aug. 27, 2014, 11 pages.

*Primary Examiner* — Dao Q Ho

(57) ABSTRACT

Various embodiments are generally directed to techniques to form secure communications between two computing devices in which the chain of trust of those communications is extended to a particular application routine executed by one of the two computing devices. An apparatus includes a processor component; a verifying component to verify a link attestation credential received from a server to verify an ability of the server to form a secure pipeline, and to signal an application routine with an indication of a result of the verification by the verifying component; and a hash component to generate a return hash of a return signature associated with the application routine to indicate to the server that the application routine has also verified the link attestation credential to form the secure pipeline between the server and the application routine. Other embodiments are described and claimed.

25 Claims, 10 Drawing Sheets

(56) References Cited

U.S. PATENT DOCUMENTS

| | | | |
|---|---|---|---|
| 2002/0083332 A1* | 6/2002 | Grawrock | G06F 21/445 726/26 |
| 2003/0226031 A1 | 12/2003 | Proudler et al. | |
| 2005/0216736 A1 | 9/2005 | Smith | |
| 2012/0090017 A1 | 4/2012 | Herzog et al. | |

* cited by examiner

TECHNIQUES FOR EXTENDING COMMUNICATIONS CHAIN OF TRUST TO CLIENT APPLICATIONS

TECHNICAL FIELD

Embodiments described herein generally relate to extending a chain of trust in communications between a server and client device to a client application of the client device.

BACKGROUND

It has become commonplace to employ any of a variety of security protocols and attestation schemes to enable each of two devices to evaluate the trustworthiness of the other, and to then form and maintain a secure "pipeline" or "channel" of communications between them to securely exchange data, even through a publicly accessible network (e.g., the Internet). Such approaches are frequently used in financial transactions, online purchases, streaming audio/visual programs, etc.

A chief concern sought to be addressed by such approaches is preventing the so-called "man in the middle" scenario from arising, in which another device may capture and/or inject commands and/or data into such communications, or may even become inserted into such communications to selectively relay and/or alter such communications. Stated differently, a primary goal of such approaches is to form a chain of trust directly between the two devices seeking to engage in secure communications to form that secure pipeline or channel therebetween.

Unfortunately, the successful formation of such a chain of trust enabling such secure communications between two devices does nothing to address concerns over security vulnerabilities within one or the other the two devices. In complex devices, there may be a particular application routine with which secure communications are meant to take place, but there may be numerous ways in which another routine may be interposed between that particular application and the interface by which that device engages in secure communications with another device. There is also the possibility that an application with which secure communications are meant to take place may not actually be executed on one of the two devices engaged in secure communications, but may actually be executed on a third device that communications with one of the two devices through communications that are not secured.

DETAILED DESCRIPTION

Figure 1:
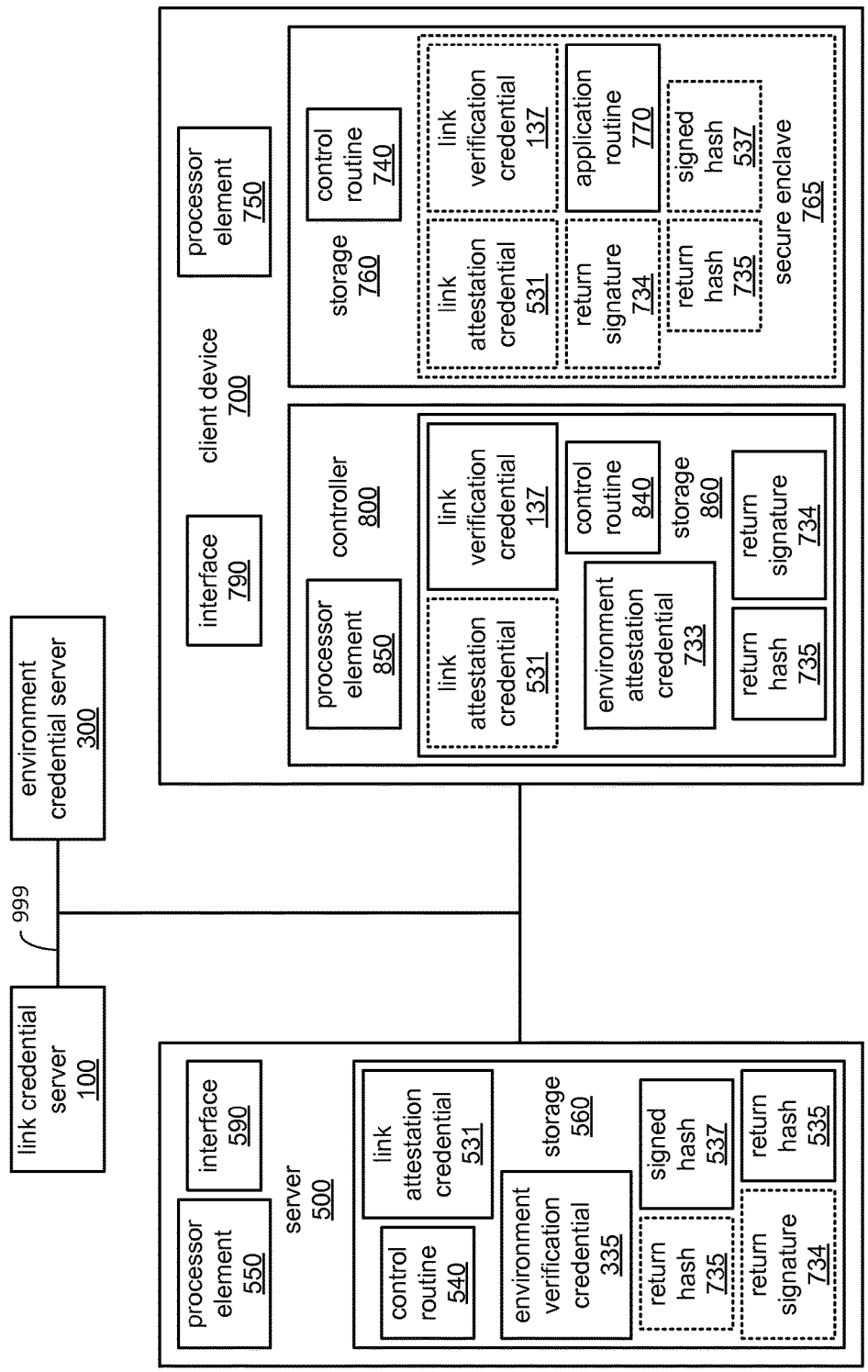
FIG. 1 illustrates an embodiment of a secure communications system.

Various embodiments are generally directed to techniques to form secure communications between two computing devices in which the chain of trust of those communications is extended to a particular application routine executed by one of the two computing devices. More specifically, secure communications are formed between two computing devices and then extended within one of the computing devices to a particular application routine to ensure that the secure communications are not interfered with by another routine within that computing device, and to ensure that the particular application is executed within that computing device, and not another.

The formation of such secure communications begins with the formation of a unidirectional secure pipeline or channel between two computing devices of a secure communications system. After being formed between the two computing devices, the unidirectional secure pipeline is then extended further into one of the computing devices and to a particular application routine executed within that computing device. The now extended unidirectional secure pipeline is then made into a bidirectional secure pipeline, thereby establishing two-way secure communications on a lower link or pipeline level with that application routine at one of the endpoints. This is followed by verifying the establishment of two-way secure communications at a higher applications level through that bidirectional secure pipeline.

The formation of the initial unidirectional secure pipeline between the two computing devices may be carried out using any of a variety of known protocols for establishing such a pipeline in which there is an exchange of some form of security credential, including and not limited to, transport layer security (TLS). A form of secure processing environment is provided within one of the two computing devices, and this secure processing environment serves as one of the endpoints of this initial unidirectional secure pipeline. It is this secure processing environment of the one computing device that receives the security credential from the other computing device.

An application routine is executed within that secure processing environment to provide at least some degree of protection from interference with its execution by other routines also executed within that same computing device. The same security credential provided to the secure processing environment is also provided to the application routine to allow the application routine to independently verify the credential. Successful verification of that security credential by the application routine effectively extends that unidirectional secure pipeline to the application routine.

In response to such verification by the application routine, a signature is generated within the secure processing environment from one or more of the credential received by the application routine, data representing an aspect of the context of execution of the application routine (e.g., a portion or hash of a portion of the application routine, itself), and a security credential of the secure processing environment (e.g., a key, etc.). A hash is then calculated of that signature, and that hash is provided to the other computing device. The hash may be regarded as a "commitment" to the other computing device to later send the actual signature to the other computing device.

Although the other computing device may not possess a security credential that could be used to analyze the hash, the receipt of the hash is enough to trigger the other computing device to sign the hash using the same security credential earlier used to form the original unidirectional secure pipeline. The hash is stored within the other computing device in its original unsigned form, and the signed hash is provided back to the application routine. If the signed hash is able to be verified, then such verification is taken as proof that the other computing device with which the secure pipeline was formed is the same computing device at the other end of that secure pipeline on an application level.

In response to such verification, the earlier generated signature from which the original unsigned hash was derived is then provided to the other computing device to demonstrate to the other computing device that the application routine to which the secure pipeline was extended is the same application routine at the other end of that secure pipeline on an application level. The provision of this signature may be regarded as "honoring" on the earlier "commitment" to provide the earlier generated signature to the other computing device.

The other computing device then independently derives a hash of that signature and compares that hash to the original unsigned hash that it received earlier. If the two hashes match, then secure communications at both a lower pipeline level and an application level have been established between the other computing device and the application routine. If the signature was generated also from the security credential of the secure processing environment, then the signature may be further verified by the other computing device in a manner to verify the security credential of the secure processing environment to prove that the application routine is executed within that secure processing environment.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will be apparent from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram of an embodiment of a secure communications system 1000 incorporating one or more of a link credential server 100, an environment credential server 300, a server 500 and a client device 700. Each of these computing devices 100, 300, 500 and 700 may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc.

As depicted, one or more of these computing devices 100, 300, 500 and 700 exchange signals associated with establishing secure communications between the computing devices 500 and 700. However, one or more of these computing devices may exchange other data entirely unrelated to secure communications with each other and/or with still other computing devices (not shown) via the network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In preparation for efforts to establish secure communications between the server 500 and the client device 700, both are provided with credentialing data (not specifically shown) by the link credential server 100 operated by a certificate authority that issues credentials for use in the formation of secure pipelines between devices. Depending on the particular protocol to be used in forming a secure pipeline between the server 500 and the client device 700, any of a variety of types of credentials may be provided to each of these computing devices by the link credential server 100. By way of example, the server 500 may be provided with a private key and the client device 700 may be provided with a matching public key enabling the client device 700 to verify a credential provided to it by the server 500 as part of establishing at least a unidirectional secure pipeline with the server 500 in preparation for receiving some service provided by the server 500.

Also in preparation for efforts to establish secure communications between the server 500 and the client device 700 on an application level, both are provided with credentialing data (not specifically shown) by the environment credential server 300 operated by a certificate authority that issues credentials for use in verifying the presence of a secure processing environment in client devices. Depending on the particular protocol to be used in verifying that the client device 700 provides a secure processing environment in which data may be securely stored and in which an application routine may be securely executed, any of a variety of types of credentials may be provided to each of these computing devices by the environment credential server 300. By way of example, a secure processing environment of the client device 700 may be provided with a private key and the server 500 may be provided with a matching public key enabling the server 500 to verify a credential provided to it by the client device 700 as part of attesting that the client device 700 does provide such a secure processing environment.

It should be noted that the provision of such credentialing data to the computing devices 500 and 700 may be via the network 999 and/or by entirely different mechanisms. By way of example, one or both of these computing devices may be provided with at least a subset of such credentialing data at the time of their manufacture and/or at the time of manufacture of one or more of their components (e.g., their chipsets and/or firmware). By way of another example, one or both of these computing devices may be provided with initial credentialing data (e.g., a private key or other security credential) at the time of manufacture to later use in obtaining at least a subset of security credentials by contacting the link credential server 100 and/or the environment credential server 300 at a later time. Such later contact may be via the network 999.

In various embodiments, the server 500 incorporates one or more of a processor component 550, a storage 560 and an interface 590 to couple the server 500 to the network 999. The storage 560 stores one or more of a control routine 540, a link attestation credential 531, an environment verification credential 335, a return hash 735, a signed hash 537, a return signature 734 and a return hash 535.

In various embodiments, the client device 700 incorporates one or more of a processor component 750, a storage 760, a controller 800 and an interface 790 to couple the client device 700 to the network 999. The storage 760 stores one or more of a control routine 740, the link attestation credential 531, a link verification credential 137, an application routine 770, the return hash 735, the signed hash 537 and the return signature 734. The controller 800 incorporates one or more of a processor component 850 and a storage 860. The storage 860 stores one or more of a control routine 840, the link attestation credential 531, a link verification credential 137, an environment attestation credential 733, the return hash 735 and the return signature 734.

The control routines 540 and 740, as well as the application routine 770, each incorporate a sequence of instructions operative on corresponding ones of the processor components 550 and 750 in their roles as main processor components of their respective ones of the computing device 500 and 700 to implement logic to perform various functions. The control routine 840 incorporates a sequence of instructions operative on the processor component 850 in its role as a controller processor component of the controller 800 of the computing device 700 to implement logic to perform various functions.

The server 500 may be a computing device made available via the network 999 to provide any of a variety of services through secure communications to other computing devices (e.g., client devices such as the client device 700). Thus, the control routine 540 may implement logic operative on the processor component 550 to provide services that may include, but are not limited to, email hosting, data storage, audio/visual streaming, online financial services, web-based product purchasing, etc.

The client device 700 may be one of those other computing devices to which the server 500 provides services of whatever type. Thus, the application routine 770 may implement logic operative on the processor component 750 to cooperate with the server 500 (via the network 999) to make use of those services. However, the nature of the services provided may require that the application routine 770 be executed in a secure processing environment in which execution of the application routine 770 is protected, to at least some degree, from interference by other routines (e.g., malicious routines such as so-called "viruses" or "spyware"). Thus, the controller 800 may provide an operating environment isolated from that of the processor component 750 and the storage 760, with its own independent processor component 850 and storage 860 to enable execution of the control routine 840 in a manner that is significantly protected from interference by any routine executed by the processor component 750. Further, the control routine 840 may implement logic operative on the processor component 850 to cooperate with the processor component 750 to define a secure enclave 765 making up a subset of the storage 760 in which the application routine 770 may be stored as it is executed by the processor component 750.

The secure enclave 765 may be defined as a portion of the storage 760 on which is imposed heightened access restrictions and/or other restrictions to prevent access by at least some other routines executed by the processor component 750. Alternatively or additionally, the secure enclave 765 may be monitored and/or have access thereto restricted by the processor component 850 in any of a variety of ways. In various embodiments, the control routine 740 may include an operating system and/or other application routines also executed by the processor component 750, but not in a secure processing environment such as the secure enclave 765. Thus, the control routine 740 may be vulnerable to attack by other malicious routines and/or may include malicious routines such that execution of the application routine 770 needs to be protected from the control routine 740.

However, the fact of execution of the application routine 770 within a secure processing environment such as the secure enclave 765 may not be deemed sufficient to support use of the services provided by the server 500. It may be deemed desirable to implement relatively strict security in which the server 500 and the application routine 770 are both able to be assured that they are engaged in secure communications with each other that are not compromised either through the network 999 by another computing device or within the client device 700 by another routine. As will now be explained, such secure communications may entail the formation of a secure pipeline therebetween, followed by establishment of secure application level communications therebetween.

In executing the control routine 540, either as part of contacting the client device 700 or in response to being contacted by the client device 700, the processor component 550 may operate the interface 590 to transmit the link attestation credential 531 to the client device 700. Depending on the protocol used in establishing a secure unidirectional pipeline between the server 500 and the client device 700 (e.g., TLS), the link attestation credential 531 may be any of a variety of types of security credential, including and not limited to, a public or private key, a signature created with a key, a hash, a signed hash, a certificate, etc. Thus, the link attestation credential 531 may be included in whatever credentialing data provided to the server 500 by the link credential server 100 or may be generated from such credentialing data.

In executing the control routine 840, in response to receiving the link attestation credential 531 via the interface 790, the processor component 850 of the controller 800 may employ the link verification credential 137 to verify the link attestation credential 531. The link verification credential 531 is intended to function as a counterpart to the link attestation credential 531, and as with the link attestation credential 531, the link verification credential 137 may be any of a variety of types of security credential, including and not limited to, a public or private key, a signature created with a key, a hash, a signed hash, a certificate, etc. Thus, the link verification credential 137 may be included in whatever credentialing data provided to the controller 800 of the client device 700 or may be generated from such credentialing data.

The link attestation credential 531 is provided by the server 500 to the client device 700 to attest to the server 500 being a computing device with which a unidirectional secure pipeline linking the server 500 to a client device may be formed to securely convey commands and/or data from the server 500 to a client device. Successful verification of the link attestation credential 531 by the processor component 850, in executing the control routine 840, establishes a chain of trust between the server 500 and the client device 700 that effectively results in the formation of such a unidirectional secure pipeline therebetween. Presuming the link attestation credential 531 is able to be verified with the link verification credential 137, the processor component 850 may provide the link verification credential 137 to the application routine 770 such that the link verification credential 137 may be stored within the secure enclave 765 of the storage 760 to enable access to it by the application routine 770. An indication may be conveyed from the control routine 840 to the application routine 770 to the effect that the verification was successful.

In some embodiments, the processor component 850 may also provide the link attestation credential 531 it received from the server 500 to enable the processor component 750, in executing the application routine 770, to independently verify the link attestation credential 531 with the link verification credential 137. In other embodiments, the processor component 750, in executing the application routine 770, may independently contact the server 500 to cause the server 500 to resend the link attestation credential 531 to enable such independent verification by the processor component 750. Presuming that the server 500 resends the link attestation credential 531, and not a different credential, the result should be another successful verification. Successful verification of the link attestation credential by the processor component 750, in executing the application routine 770, extends the chain of trust already formed between the server 500 and the client device 700 to include the application routine 770. This effectively extends the unidirectional secure pipeline already formed between the server 500 and the client device 700 further into the client device 700 and directly to the application routine 770. As a result, the server 500 and the application routine 770 are now at opposite ends of a secure pipeline linking them, and through which the server 500 may securely transmit commands and/or data to the application routine 770.

In response to successfully independently verifying the link attestation credential 531, the processor component 750, in executing the application routine 770, may signal the processor component 850 to generate the return signature 734 from at least the link attestation credential 531 that was provided to the application routine 770. The return signature 734 may also be generated from data indicative of an aspect of the "context" of execution of the application routine 770, such as and not limited to, an indication of the size of the application routine 770 (e.g., in bytes), a hash of at least a portion of the application routine 770, etc. Alternatively or additionally, the return signature 734 may also be generated from the environment attestation credential 733. Depending on the protocol used in establishing that the client device 700 is able to provide a secure processing environment in which to execute a particular routine, the environment attestation credential 733 may be any of a variety of types of security credential, including and not limited to, a public or private key, a signature created with a key, a hash, a signed hash, a certificate, etc. Thus, the environment attestation credential 733 may be included in whatever credentialing data was provided to the controller 800 of the client device 700 by the environment credential server 300 or may be generated from such credentialing data. By way of example, protocols based on such approaches to verifying trustworthiness as direct anonymous attestation (DAA) may be used, and the environment attestation credential 733 may be a unique private key assigned to the controller 800.

Following generation of the return signature 734, a hash may be taken of the return signature 734 to generate the return hash 735, using any of a variety of hash generation techniques familiar to those skilled in the art. In some embodiments, the return signature 734 may be provided to the application routine 770 (such that the return signature 734 is stored within the secure enclave 765 to be accessible to the application routine 770) to enable the processor component 750, in executing the application routine 770, to generate the return hash 735 therefrom. In other embodiments, the processor component 850, in executing the control routine 840, generates the return hash 735. Following generation of the return hash 735 by whichever one of the processor components 750 and 850, the interface 790 is operated to transmit the return hash 735 to the server 500. In some embodiments, the return hash 735 may be provided to the application routine 770 (such that the return hash 735 is stored within the secure enclave 765 to be accessible to the application routine 770) to enable the processor component 750, in executing the application routine 770, to transmit the return hash 735 to the server 500. In other embodiments, the processor component 850, in executing the control routine 840, transmits the return hash 735 to the server 500, and may do so in response to receipt of a signal requesting its transmission from the processor component 750 (as a result of executing the application routine 770).

The server 500 may not possess a credential of any kind by which the processor component 550 may verify the return hash 735. Instead, the return hash 735 may be regarded as a "commitment" made to the server 500 during formation of the secure pipeline between the server 500 and the application routine 770 that another credential (e.g., the return signature 734) will later be sent during establishing secure communications at an application level for the server 500 to verify. In response to the receipt of the return hash 735, the processor component 550, in executing the control routine 540, may store the return hash 735 in the storage 560. The processor component 550 may also sign the return hash 735 with the link attestation credential 531 to generate the signed hash 537, and then operate the interface 590 to transmit the signed hash 537 to the application routine 770 via the secure pipeline earlier created therebetween. The processor component 550 may condition such storage and/or use of the return hash 735, and/or the sending of the signed hash 537 on whether the link attestation credential 531 was earlier transmitted to the client device 700.

In response to receiving the signed hash 537, the processor component 750, in executing the application routine 770, may verify the signed hash 537 using at least the link verification credential 137. In verifying the signed hash 537, the processor component may also use the return hash 735 from which the signed hash 537 was presumably generated by the server 500. Presuming that the server 500 signed the return hash 735 with the same link attestation credential that it sent earlier in forming the secure pipeline, the result should be another verification. Successful verification of the signed hash 537 serves to at least verify that the same server (e.g., the server 500) with which a chain of trust has already been established by the application routine 770 at a lower level to extend the secure pipeline therebetween is the same server that now seeks to establish a chain of trust at an application level therebetween. Thus, successful verification of the signed hash 537 by the processor component 750, in executing the application routine 770, begins to enable secure communications at the application level in addition to at the lower level of the secure pipeline.

In response to successfully verifying the signed hash 537, the interface 790 may be operated to transmit the return signature 734, thereby "honoring" the earlier "commitment" to so transmit the return signature 734 that was implicitly made by the earlier transmission of the return hash 735 to the server 500. In some embodiments, the return signature 734 may be provided to the application routine 770 (such that the return signature 734 is stored within the secure enclave 765 to be accessible to the application routine 770) to enable the processor component 750, in executing the application routine 770, to transmit the return signature 734 to the server 500. In other embodiments, the processor component 850, in executing the control routine 840, transmits the return signature 734 to the server 500, and may do so in response to receipt of a signal requesting its transmission from the processor component 750 (as a result of executing the application routine 770).

In response to the receipt of the return signature 734, the processor component 550, in executing the control routine 540, may generate the return hash 535 from the return signature 734, and then compare the return hashes 735 and 535 to verify the return signature 734. Presuming that the return signature 734 received by the server 500 is the same return signature from which the return hash 735 was earlier generated, and not another signature, then the result should be a successful verification of the return signature 734. Such successful verification of the return signature would at least verify that the same application routine (e.g., the application routine 770) with which a chain of trust has already been established by the server 500 at a lower level to extend the secure pipeline therebetween is the same application routine that now seeks to complete establishment of a chain of trust at an application level therebetween.

However, in embodiments in which the return signature 734 was generated using the environment attestation credential 733 (in addition to using the link attestation credential 531 received by the application routine 770), completing establishment of such a chain of trust may be conditioned on further verification of the return signature with the environment verification credential 335. The environment verification credential 335 is intended to function as a counterpart to the environment attestation credential 733, and as with the environment attestation credential 733, the environment verification credential 335 may be any of a variety of types of security credential, including and not limited to, a public or private key, a signature created with a key, a hash, a signed hash, a certificate, etc. Thus, the environment verification credential 335 may be included in whatever credentialing data was provided to the server 500 by the environment credential server 300 or may be generated from such credentialing data. The environment attestation credential 733 may be employed in generating the return signature 734 by the client device 700 to attest to the client device 700 providing a secure processing environment in which to execute an application routine (e.g., the application routine 770). Successful verification of the return signature 734 with the environment verification credential 335 by the processor component 550, in executing the control routine 540, establishes that the application routine 770 is executed within such a secure processing environment.

Figure 2:
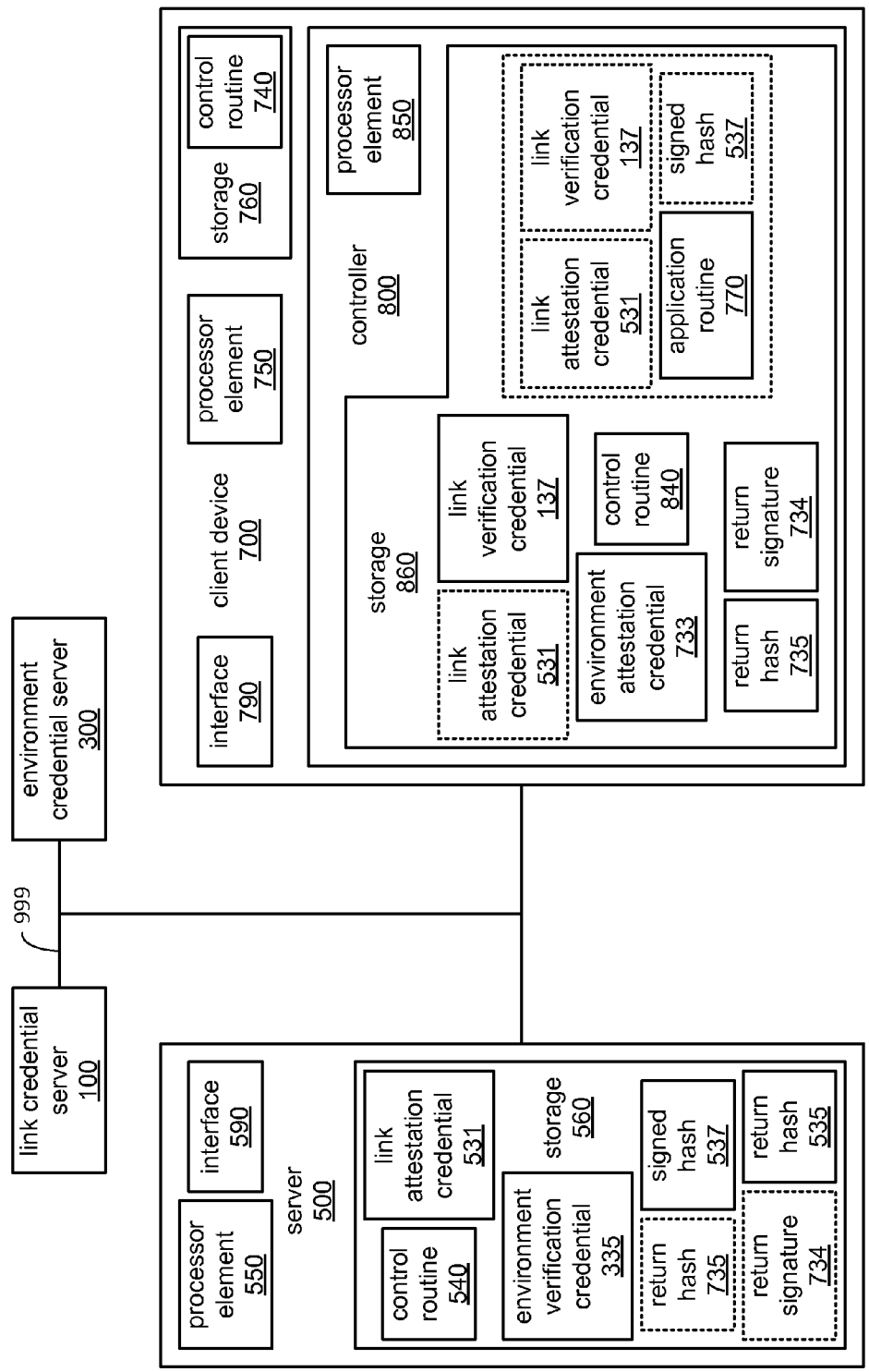
FIG. 2 illustrates an alternate embodiment of a secure communications system.

FIG. 2 illustrates a block diagram of an alternate embodiment of the secure processing system 1000 that includes an alternate embodiment of the client device 700. The alternate embodiment of FIG. 2 is similar to the embodiment of FIG. 1 in many ways, and thus, like reference numerals are used to refer to like components throughout. However, the manner in which a secure processing environment is provided for the execution of the application routine 770 differs between the two depicted embodiments of the client device 700. Specifically, unlike the client device 700 of FIG. 1 in which the application routine 770 is stored in the secure enclave 765 defined within the storage 760 and is executed by the processor component 750, the application routine 770 is stored within the storage 860 and is executed by the processor component 850 of the controller 800 in the client device 700 of FIG. 2. Thus, in FIG. 2, execution of the application routine 770 is protected from other routines executed by the processor component 750 (including the control routine 740) by its execution in the isolated operating environment of the controller 800. Given the storage of the application routine 770 within the storage 860, neither of the return signature 734 or the return hash 735 may need to be copied into any portion of the storage 760.

In various embodiments, each of the processor components 550, 750 and 850 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, each of the storages 560, 760 and 860 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 590 and 790 may employ any of a wide variety of signaling technologies enabling computing devices to be coupled to other devices as has been described. Each of these interfaces may include circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 3:
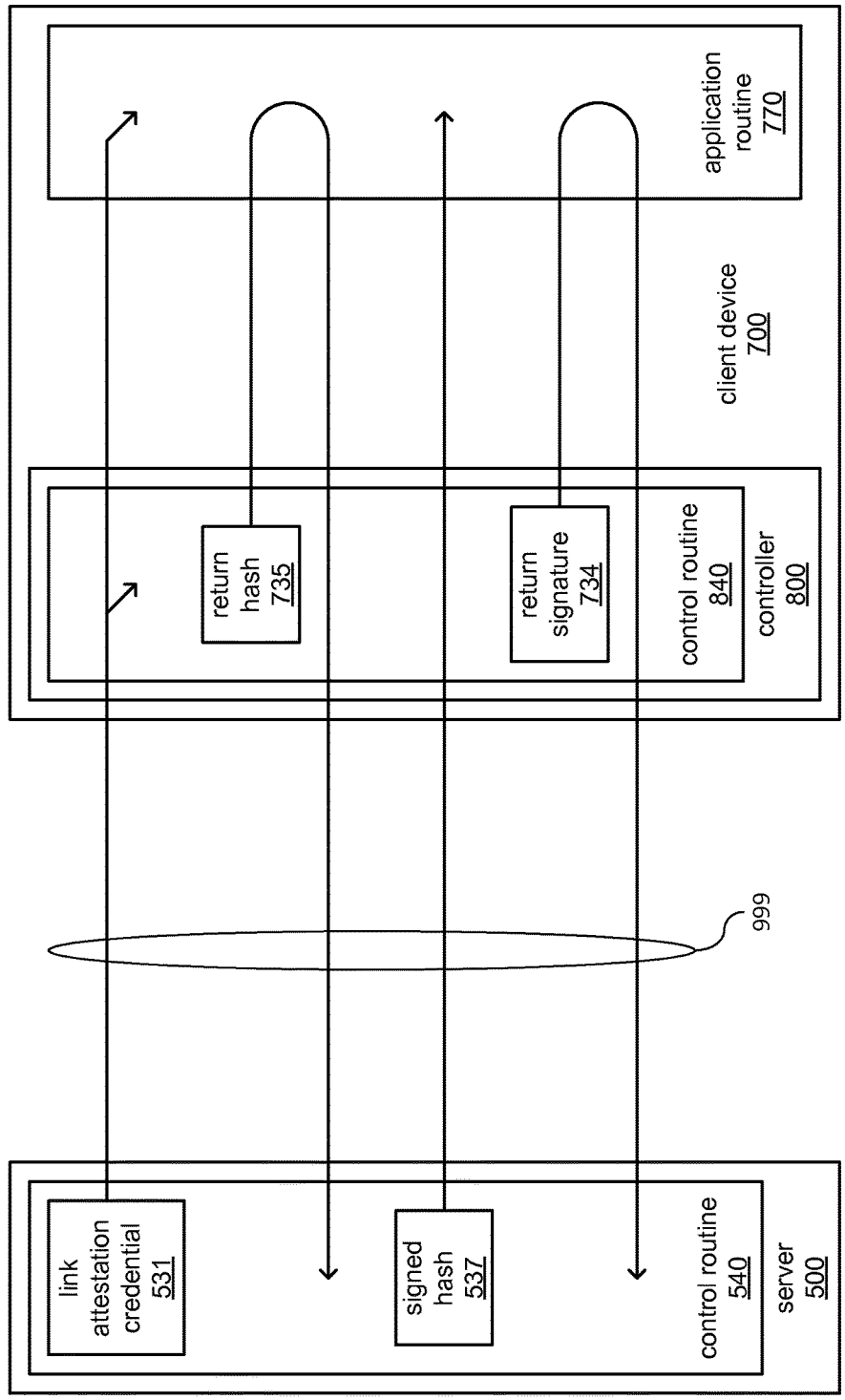
FIG. 3 illustrates an embodiment of an exchange of security credentials.

FIG. 3 depicts an embodiment of the exchange of credentials among the control routines 540 and 840 executed by the processor components 550 and 850, respectively, and the application routine 770 executed by either of the processor components 750 or 850. Again, exchanges of credentials are employed to establish a chain of trust at a lower pipeline level and then at a higher application level.

The link attestation credential 531 is transmitted by the control routine 540 from the server 500 to the control routine 840 of the controller 800 of the client device 700 to be verified by the processor component 850 to form a unidirectional secure pipeline from the server 500 to the controller 800 of the client device 700. In some embodiments, the processor component 850 may relay the link attestation credential 531 to the application routine 770 to be independently verified by the processor component 750 (or by the processor component 850 executing the application routine 770) to extend that unidirectional secure pipeline to the application routine 770. In other embodiments, the processor 750 or 850, in executing the application routine 770, requests the server 500 to resend the link attestation credential 531 to enable such independent verification.

Presuming the link attestation credential 531 is verified both times, the return hash 735 is transmitted to the control routine 540 of the server 500. In some embodiments, the processor component 850, in executing the control routine 840 transmits the return hash 735 to the server 500. In other embodiments, the processor component 750 or 850, in executing the application routine 770, receives the return hash 735 from the control routine 840, and then transmits it to the server 500 (as depicted with an arrow looping through the application routine 770).

The processor component 550, in executing the control routine 540, receives the return hash 735 and signs the return hash 735, thereby generating the signed hash 537. The processor component 550 then transmits the signed hash to the application routine 770 to be verified.

The processor component 750 or 850, in executing the application routine 770, receives the signed hash 537 and verifies it. Presuming the signed hash 537 is successfully verified, the return signature 734 is transmitted to the server 500. In some embodiments, the processor component 850, in executing the control routine 840 transmits the return signature 734 to the server 500. In other embodiments, the processor component 750 or 850, in executing the application routine 770, receives the return signature 734 from the control routine 840, and then transmits it to the server 500 (as depicted with another arrow looping through the application routine 770).

Figure 4:
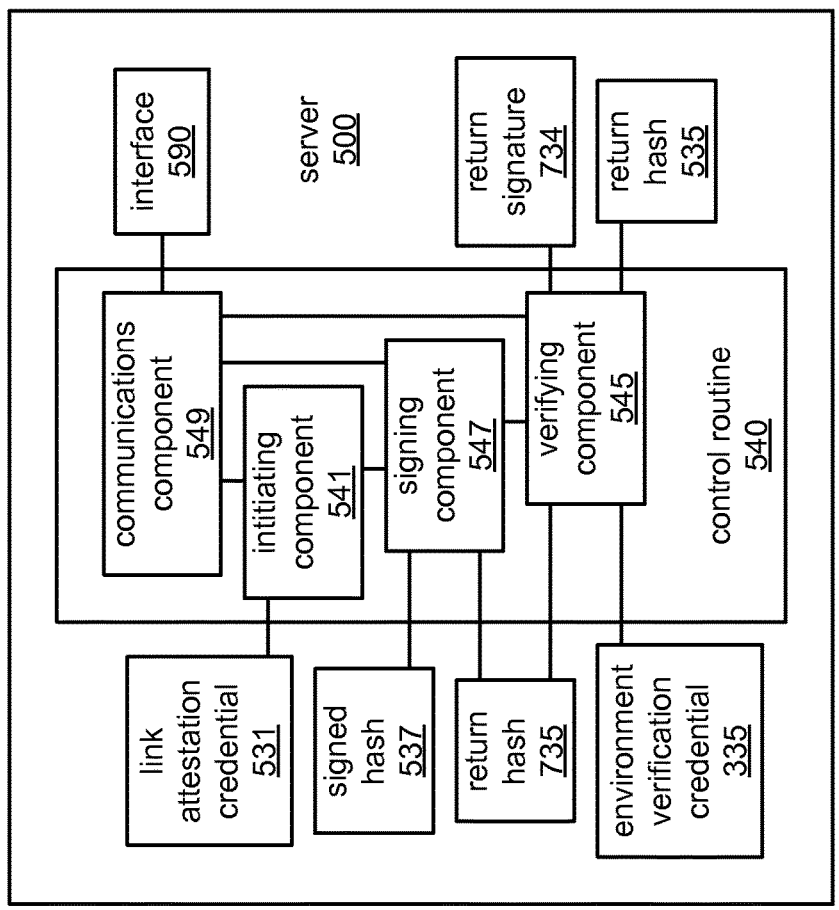
FIGS. 4-6 each illustrate a portion of an embodiment of a secure communications system.
Figure 5:
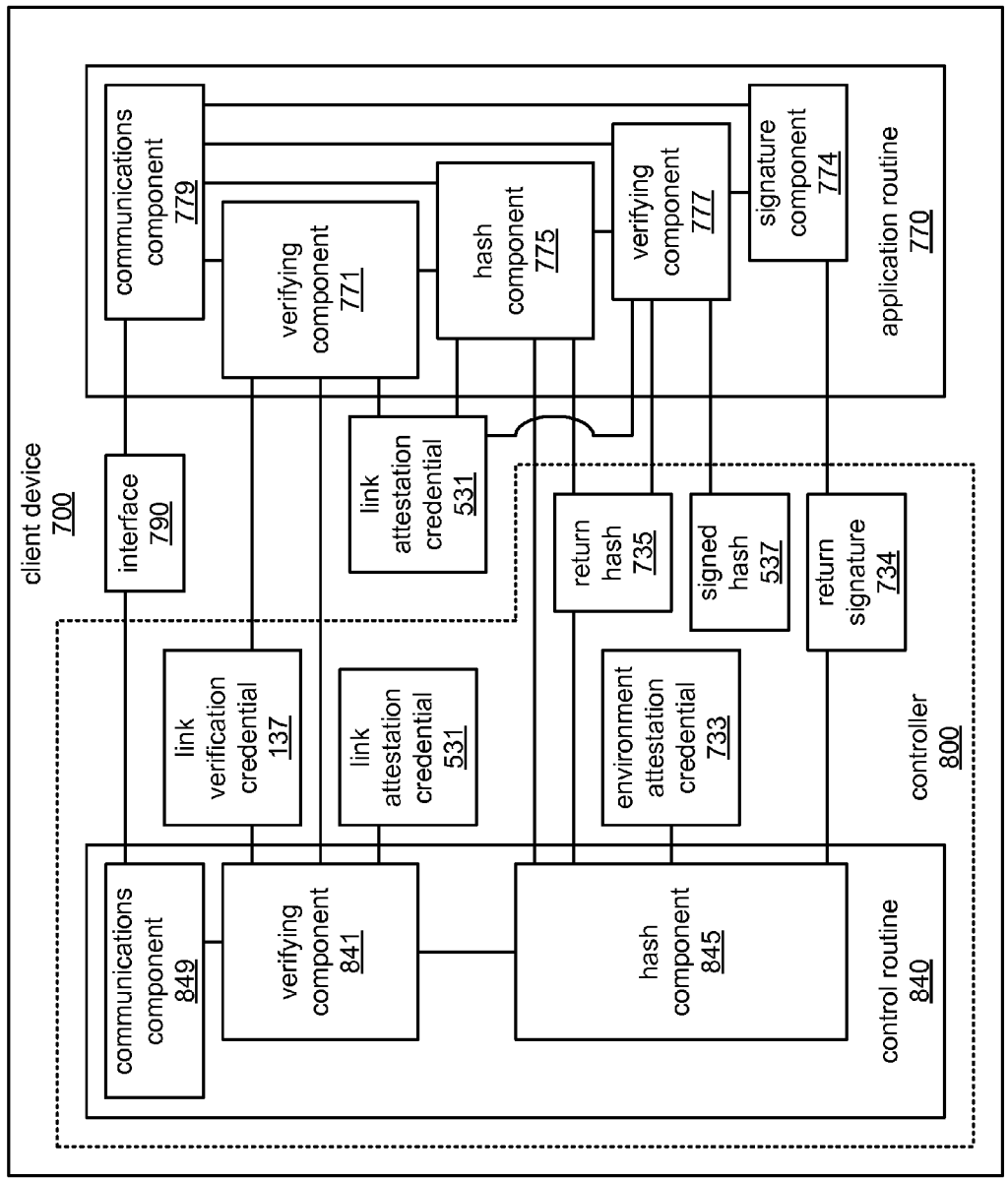
Figure 6:
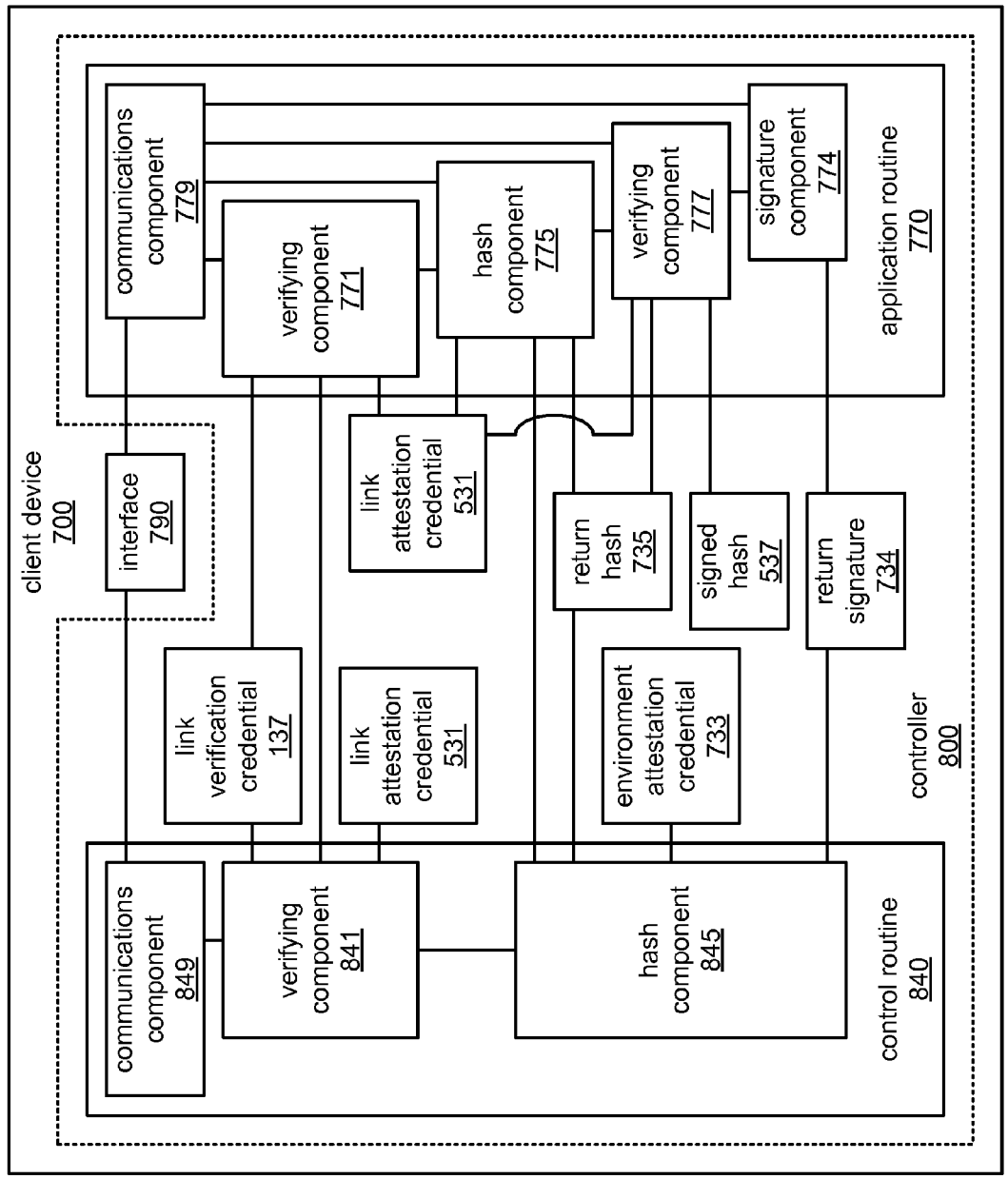

FIG. 4 illustrates a block diagram of a portion of an embodiment of the secure communications system 1000 of either FIG. 1 or 2 in greater detail. More specifically, FIG. 4 depicts aspects of the operating environment of the server 500 in which the processor component 550, in executing the control routine 540, cooperates with the client device 700 to establish secure communications between the server 500 and the application routine 770. FIG. 5 illustrates a block diagram of a portion of an embodiment of the secure communications system 1000 of FIG. 1 in greater detail, and FIG. 6 illustrates a block diagram of a corresponding portion of an embodiment of the secure communications system 1000 of FIG. 2 in greater detail. More specifically, FIGS. 5 and 6 both depict aspects of the operating environment of different embodiments of the client device 700 in which the processor components 750 and/or 850, in executing corresponding ones of the control routine 840 and the application routine 770, cooperate with the server 500 in establishing such secure communications. FIGS. 5 and 6 differ in a manner that minors the manner in which FIGS. 1 and 2 differ. Specifically, FIG. 5, like FIG. 1, depicts an embodiment of the client device 700 in which the application routine 770 is stored within the storage 760 and is executed by the processor component 750. Correspondingly, FIG. 6, like FIG. 2, depicts an embodiment of the client device 700 in which the application routine 770 is stored within the storage 860 and is executed by the processor component 850.

As recognizable to those skilled in the art, the control routines 540, 740 and 840, as well as the application routine 770, including the components of which each is composed, are selected to be operative on whatever type of processor or processors that are selected to implement applicable ones of the processor components 550, 750 or 850. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor components 550, 750 or 850. Where one or more device drivers are included, those device drivers may provide support for any of a variety of other components, whether hardware or software components, of corresponding ones of the computing devices 500 or 700, as well as the controller 800.

Each of the control routines 540 and 840, as well as the application routine 770, may include a communications component 549, 849 and/or 779 executable by an applicable one of the processor components 550, 750 or 850 to operate an applicable one of the interfaces 590 or 790 to transmit and receive signals via the network 999 as has been described. Among the signals exchanged may be signals conveying various security credentials among one or more of the computing devices 100, 300, 500 and/or 700 via the network 999. As recognizable to those skilled in the art, these communications components are selected to be operable with whatever type of interface technology is selected to implement corresponding ones of the interfaces 590 and 790.

Turning more specifically to FIG. 4, the control routine 540 may include an initiating component 541 executable by the processor component 550 to at least transmit the link attestation credential 531 to the client device 700 (via the communications component 549) as part of beginning to establish secure communications with the application routine 770. The initiating component 541 may do so either in response to the server 500 being contacted by the client device 700 or as part of initiating secure communications with the client device 700. As has been discussed, the link attestation credential 531 may be provided to the server 500 as part of credentialing data received from the link credential server 100, or may be generated by the initiating component 541 from such data.

The control routine 540 may include a signing component 547 executable by the processor component 550 to sign the return hash 735 to generate the signed hash 537 upon receipt of the return hash 735 from the client device 700. As has been discussed, the return hash 735 is signed with the link attestation credential 531 to provide an attestation to the client device 700 that the server 500 at one end of the secure pipeline that has been formed is the same server that seeks to form a chain of trust at an application level. Upon being generated, the signed hash 537 is transmitted back to application routine 770 at the other end of that secure pipeline (via the communications component 549). It should be noted that the signing component 547 may condition signing the return hash 735 and/or providing the signed hash 537 to the client device 700 on receiving a signal from the initiating component 541 indicating that the link attestation credential 531 was earlier provided to the client device 700.

The control routine 540 may include a verifying component 545 executable by the processor component 550 to verify the return signature 734 upon receipt of the return signature 734 from the client device 700. The verifying component 545 performs a hash operation on the return signature 734 to generate the return hash 535, and then compares the return hashes 735 and 535 to determine if they match. If they do match, then the return signature 734 is deemed verified at least to the extent of proving that the application routine 770 at the other end of the chain of trust at the application level is the same application routine at the other end of the earlier formed secure pipeline.

However, as has been discussed, the return signature 734 may also have been generated within the client device 700 using the environment attestation credential 733 to attest to the ability of the client device 700 to provide a secure processing environment for the execution of an application routine, such as the application routine 770. Therefore, in such embodiments, the verifying component 545 may also employ the environment verification credential 335 to further verify the return signature 734. Presuming that such further verification is successful, then it is deemed proven that the application routine 770 is being executed within the secure processing environment provided by the client device 700, thereby completing formation of the chain of trust between the server 500 and the application routine 770 at the application level. As previously discussed, the environment verification credential 335 is a counterpart to the environment attestation credential 733, and may be either provided to the server 500 in credentialing data received from the environment credential server 300 or derived from such data. It should be noted that the verifying component 545 may condition its performance of one or both of these verifications of the return signature 734 on receiving a signal from the signing component 547 indicating that the return hash 735 was earlier received and signed and/or that the signed hash 537 was earlier provided to client device 700.

Turning more specifically to FIGS. 5 and 6, the control routine 840 may include a verifying component 841 executable by the processor component 850 to at least employ the link verification credential 137 to verify the link attestation credential 531 received from the server 500 as part of beginning to establish secure communications with the server 500. As has been discussed, the link verification credential 137 may be provided to the controller 800 of the client device 700 as part of credentialing data received from the link credential server 100.

The application routine 770 may include a verifying component 771 executable by the processor component 750 or 850 to at least employ the link verification credential 137 to verify the link attestation credential 531 independently of the verification performed by the verifying component 841 of the control routine 840. It should be noted that the verifying component 771 may condition its performance of a verification on receiving a signal from the verifying component 841 indicating that the performance of verification by the verifying component 841 resulted in a successful verification. As has been discussed, verifying component 771 may receive the link attestation credential 531 from the control routine 840 (e.g., from the verifying component 841) or in a separate transmission of the link attestation credential 531 from the server 500. As with the verifying component 841, the verifying component 771 performs verification using the link verification component 137, which the verifying component 771 may receive from the control routine 840 (e.g., from the verifying component 841).

The application routine 770 may include a hash component 775 executable by the processor component 750 or 850, and the control routine 840 may include a hash component 845 executable by the processor component 850 to cooperate to generate the return signature 734 and then generate the return hash 735 therefrom, and to provide the return hash 735 to the server 500. The hash component 775 may signal the hash component 845 to generate the return signature 734 and return hash 735, may then receive the return hash 735 from the hash component 845, and may then transmit the return has 735 to the server 500 (via the communications component 779). As has been discussed, the return signature 734 is generated at least from the link attestation credential 531 received by the application routine 770 (via the communications component 779) from the server 500. However, the return signature 734 may also be generated from the environment attestation credential 733 and/or from data indicative of the context of the execution of the application routine 770 (e.g., the size of the application routine in bits or bytes, a hash of a portion of the application routine 770, etc.). As has been discussed, the environment attestation credential 733 may be provided to the controller 800 of the client device 700 as part of credentialing data received from the environment credential server 200, or may be generated by the hash component 845 from such data. It should be noted that the hash component 845 may condition its generation of the return signature 734 and/or the return hash 735 on receiving a signal from the hash component 775 requesting the return hash 735. In turn, the has component 775 may condition signaling the hash component 845 with such a request and/or transmitting the return hash 735 to the server 500 on receiving a signal from the verifying component 771 indicating that its verification of the link attestation credential 531 was successful.

The application routine 770 may include a verifying component 777 executable by the processor component 750 or 850 to employ the return hash 735 and/or the link attestation credential 531 received by the application routine 770 to verify the signed hash 537 received from the server 500. It should be noted that the verifying component 777 may condition its performance of verification on receiving a signal from the hash component 775 indicating that the return hash 735 was earlier provided to the server 500.

The application routine 770 may include a signature component 774 executable by the processor component 750 or 850 to transmit the return signature 734 to the server 500 in response to successful verification of the signed hash 537. The signature component 774 may be triggered to do so by receipt of a signal from the verifying component 777 that the signed hash 537 was successfully verified.

Figure 7:
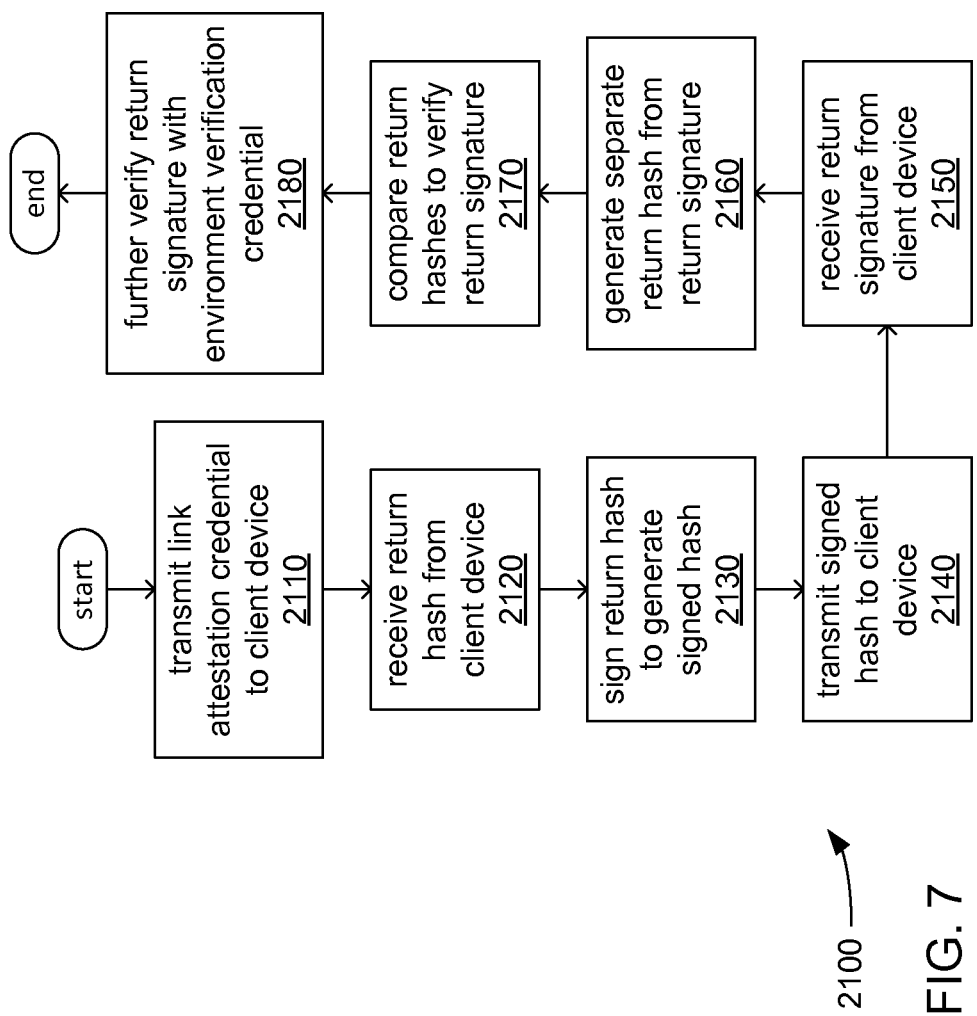
FIGS. 7-9 each illustrate a logic flow according to an embodiment.

FIG. 7 illustrates one embodiment of a logic flow 2100. The logic flow 2100 may be representative of some or all of the operations executed by one or more embodiments described herein. More specifically, the logic flow 2100 may illustrate operations performed by the processor component 550 in executing at least the control routine 540, and/or performed by other component(s) of the server 500.

At 2110, a processor component of a server of a secure communications system (e.g., the processor component 550 of the server 500 of the secure communications system 1000) transmits a link attestation credential to a client device of the secure communications system (e.g., the client device 700). As previously discussed, the link attestation credential may any of a variety of types of security credential depending on the nature of the protocol used in forming a secure pipeline between the server and the client device. As also previously discussed, the server may receive a request from the client device to transmit the link attestation credential to the client device a second time to separately provide the link attestation credential directly to an application routine of the client device.

At 2120, a return hash is received from the client device. As previously discussed, the transmission of the return hash to the server serves as an indication that the secure pipeline has been formed between the server and the client device, and that the secure pipeline has been further extended within the client device to the application routine.

At 2130, the server signs the return hash with the link attestation credential to generate a signed hash, and the server transmits the signed hash to the client device at 2140. As previously discussed, the server may not have the ability to verify the signed hash in any way, but still takes receipt of the signed hash as an indication that a chain of trust between the server and the application routine at the lower level of the secure pipeline has been formed. Thus, the server transmits the signed hash to the client device to begin forming another chain of trust between the server and the application routine at a higher application level.

At 2150, the server receives a return signature from the client device, and generates a separate return hash from the return signature at 2160. At 2170, the server then compares the return hash earlier received from the client device to the separate return hash it has generated to verify that the earlier received return hash was generated from the return signature.

At 2180, the server may use an environment verification credential to further verify the return signature. As previously discussed, the return signature may have been formed additionally with an environment attestation credential that attests to the ability of the client device to provide a secure processing environment for the execution of the application routine. If both of the verifications at 2170 and 2180 are successful, then it is deemed proven that the same application routine at the opposite end of the secure pipeline from the server is the same application routine with which a chain of trust has now been formed at the application level, and that the application routine is being executed in the secure processing environment of the client device.

Figure 8:
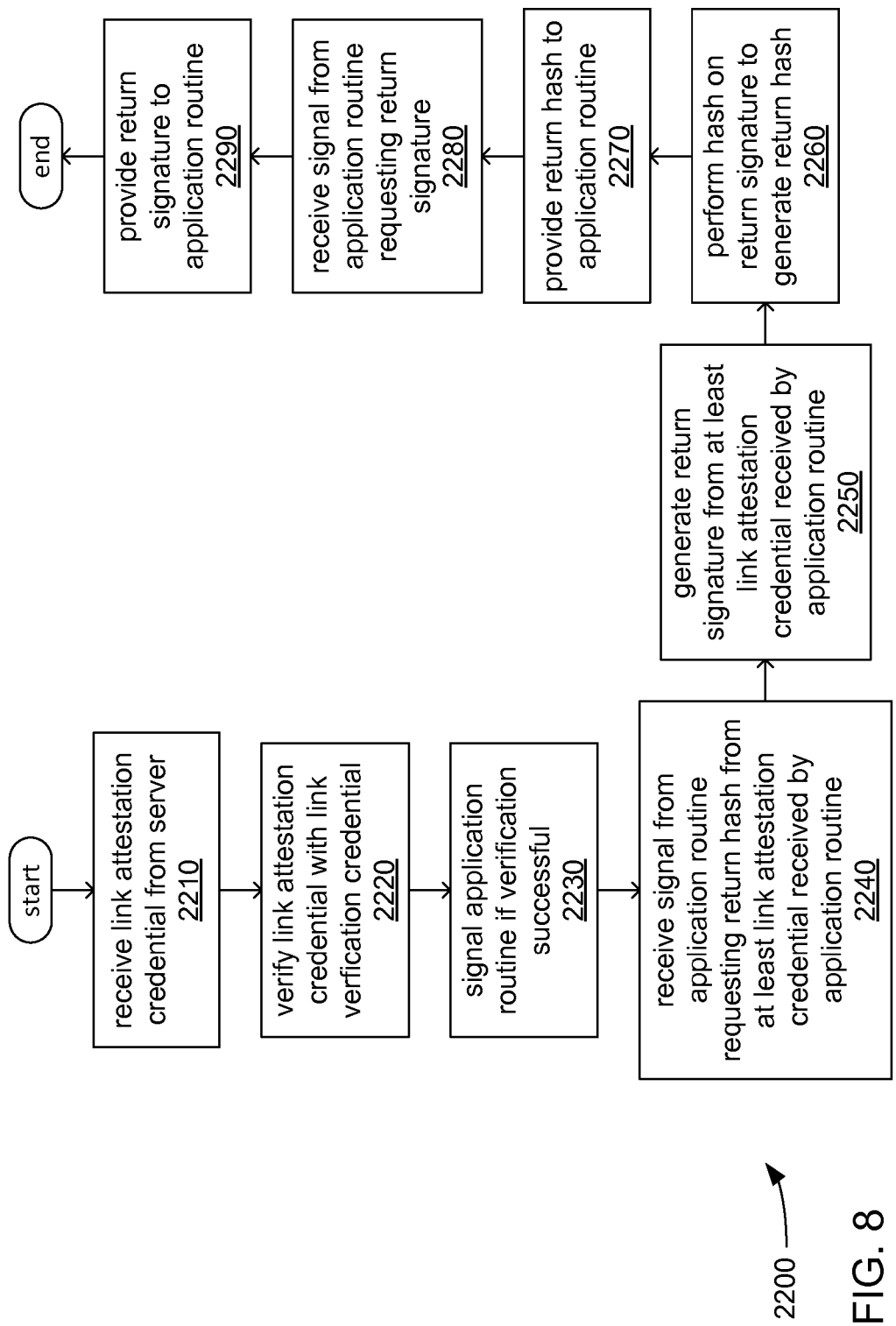

FIG. 8 illustrates one embodiment of a logic flow 2200. The logic flow 2200 may be representative of some or all of the operations executed by one or more embodiments described herein. More specifically, the logic flow 2200 may illustrate operations performed by the processor component 850 in executing at least the control routine 840, and/or performed by other component(s) of the controller 800 and/or the client device 700.

At 2210, a processor component that provides a secure processing environment of a client device of a secure communications system (e.g., the processor component 850 of the controller 800 of the client device 700 of the secure communications system 1000) receives a link attestation credential from a server of the secure communications system (e.g., the server 500). As previously discussed, the link attestation credential may any of a variety of types of security credential depending on the nature of the protocol used in forming a secure pipeline between the server and the client device.

At 2220, the processor component verifies the link attestation credential using a link verification credential associated with the link attestation credential, these two credentials having been created as counterparts to each other. Presuming the verification is successful, at 2230, the processor component signals the application routine of the successful verification. As previously discussed, this may serve as a trigger to the application routine to independently perform its own verification of the link attestation credential using the link verification credential. As also previously discussed, the application routine may be provided one or both of these credentials by the processor component, and/or may signal the server to separately transmit the link attestation credential a second time to the application routine.

At 2240, the processor component receives a signal from the application routine requesting the generation of a return hash from at least the link attestation credential as received by the application routine. In preparation for generating the return hash, the processor component generates a return signature using at least the link attestation credential received by the application routine at 2250. As previously discussed, the return signature may also be generated from an environment attestation credential that attests to the ability of the processor component to provide a secure processing environment for execution of the application routine. As also previously discussed, the return signature may also be generated from data indicative of an aspect of the context of the execution of the application routine.

At 2260, the processor component performs a hash on the return signature to generate the return hash, and then provides the return hash to the application routine at 2270. As previously explained, the return hash is transmitted to the server to provide an indication to the server that the link attestation credential has been verified by both the processor component and the application routine such that a chain of trust serving as the basis for formation of a secure pipeline between the server and the application routine no exists. As also previously discussed, the processor component may alternatively transmit the return hash to the server, itself, on behalf of the application routine in other embodiments.

At 2280, the processor component receives a signal from the application routine requesting the return signature, and the processor component provides the return signature to the application routine at 2290. As also previously discussed, the processor component may alternatively transmit the return signature to the server, itself, on behalf of the application routine in other embodiments.

Figure 9:
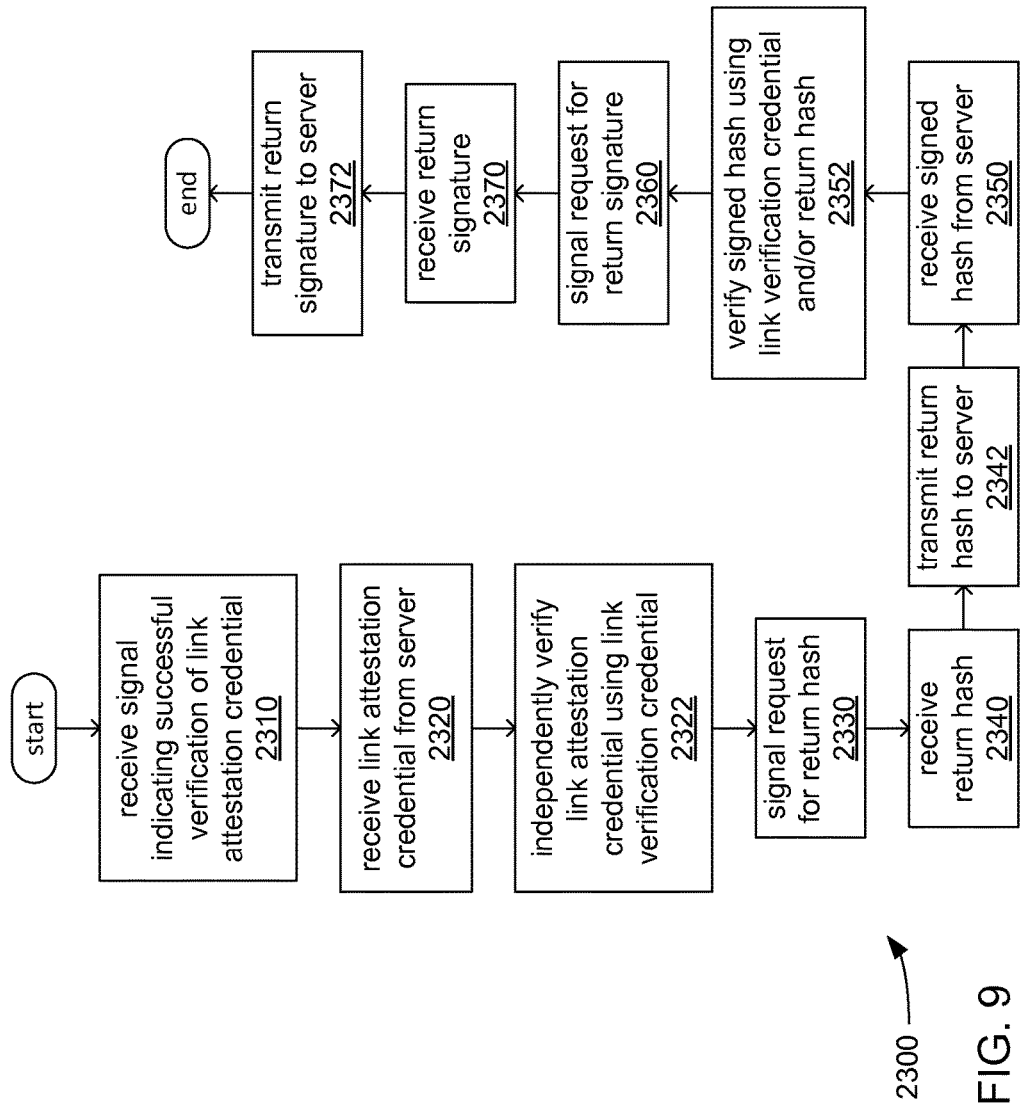

FIG. 9 illustrates one embodiment of a logic flow 2300. The logic flow 2300 may be representative of some or all of the operations executed by one or more embodiments described herein. More specifically, the logic flow 2300 may illustrate operations performed by the processor component 750 or 850 in executing at least the application routine 770, and/or performed by other component(s) of the controller 800 and/or the client device 700.

At 2310, a processor component that executes an application routine in a secure processing environment of a client device of a secure communications system (e.g., the processor component 750 or 850 of the client device 700 of the secure processing system 1000) receives a signal indicating successful verification of a link attestation credential. As previously discussed, a processor component the provides the secure processing environment performs a verification of a link attestation credential before signaling the application routine of the results of doing so to trigger the application routine to separately perform such a verification. As also previously discussed, the processor component that performs this first verification before signaling the application to perform its own may or may not be the same processor component that executes the application routine within the secure processing environment. Again, the link attestation credential attests to the ability of the server to form a secure pipeline, and may be any of a variety of types of security credential. At 2320, the processor component receives the link attestation credential from the server, and performs its independent verification of the link attestation credential at 2322.

At 2330, the application routine requests a return hash be generated from the link attestation credential received by the processor component for use by the application routine in performing its independent verification of the link attestation credential. As previously discussed, the request by the application routine for the return hash indicates that the link attestation credential was successfully verified by the application routine. As also previously discussed, the signal from the application routine requesting the return hash may be a signal from the processor component that executes the application routine to the processor component that provides the secure processing environment in embodiments in which they are not the same processor component.

At 2340, the return hash is received by the application routine and the application routine transmits it to the server at 2342. As previously discussed, however, the return hash may be transmitted to the server on behalf of the application routine in other embodiments, that transmission being effected by whatever processor component provides the secure processing environment.

At 2350, the application routine receives a signed hash from the server, and uses one or both of a link verification credential and the return hash to verify the signed hash. As previously discussed, the link verification credential is a counterpart to the link attestation credential, and its use in verifying the signed hash is to verify the signing of the return hash to generate the signed hash by the server using the link attestation credential.

Presuming verification of the signed hash is successful, the application routine then requests the return signature that was generated during the generation of the return hash at 2360. Again, the signal from the application routine requesting the return signature may be a signal from the processor component that executes the application routine to the processor component that provides the secure processing environment in embodiments in which they are not the same processor component.

At 2370, the return signature is received by the application routine and the application routine transmits it to the server at 2372. As previously discussed, however, the return signature may be transmitted to the server on behalf of the application routine in other embodiments, that transmission being effected by whatever processor component provides the secure processing environment.

Figure 10:
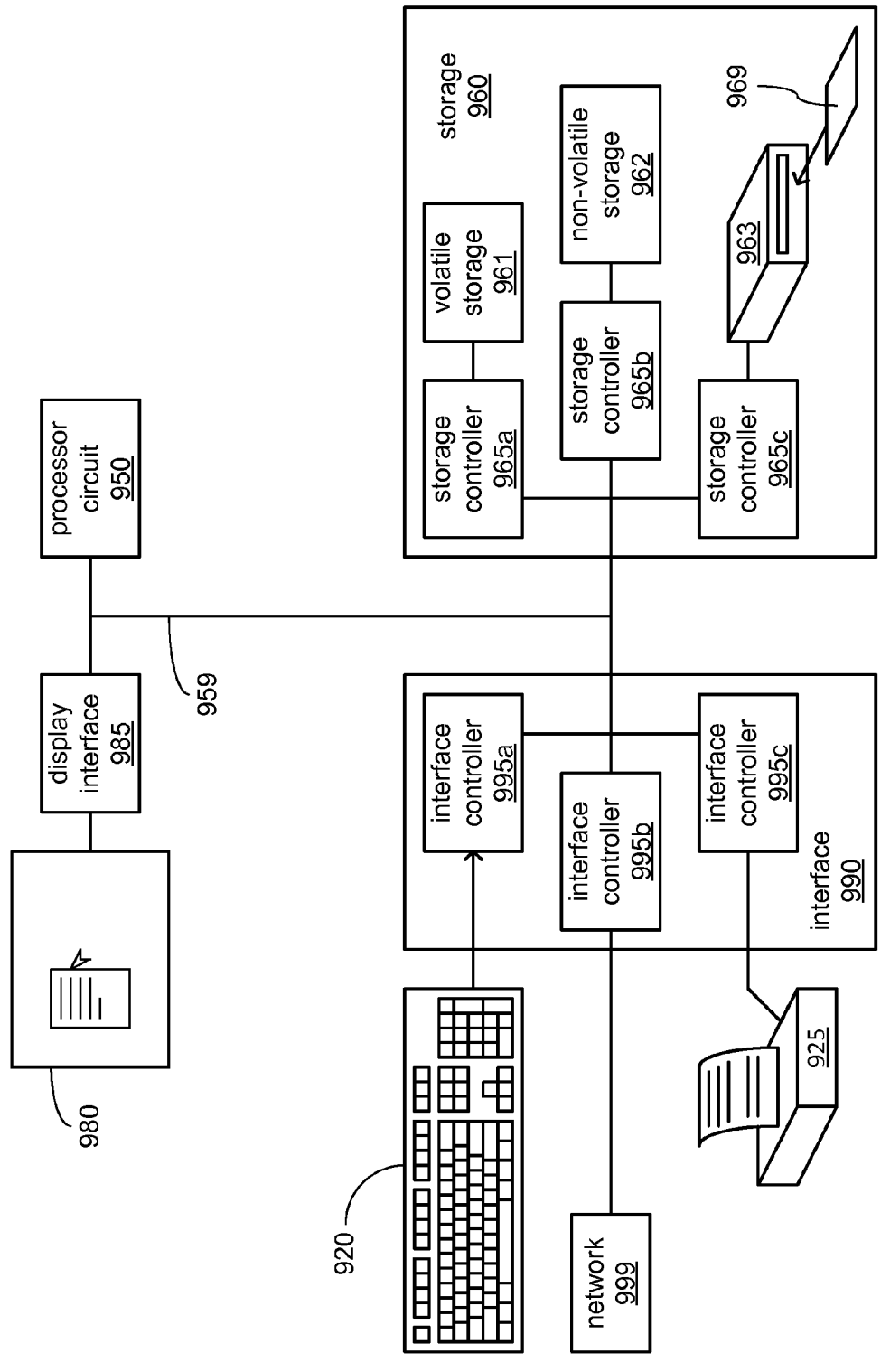
FIG. 10 illustrates a processing architecture according to an embodiment.

FIG. 10 illustrates an embodiment of a processing architecture 3000 suitable for implementing various embodiments as previously described. More specifically, the processing architecture 3000 (or variants thereof) may be implemented as part of one or more of the computing devices 100, 300 or 500. It should be noted that components of the processing architecture 3000 are given reference numbers in which the last two digits correspond to the last two digits of reference numbers of at least some of the components earlier depicted and described as part of these computing devices. This is done as an aid to correlating components of each.

The processing architecture 3000 may include various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device may include at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985, or one or more processing subsystems 900.

The coupling 959 may include one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to one or more of the processor components 550, 750 or 850) may include any of a wide variety of commercially available processors, employing any of a wide variety of technologies and implemented with one or more cores physically combined in any of a number of ways.

As previously discussed, the storage 960 (corresponding to one or more of the storages 560, 760 or 860) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 to implement various embodiments may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 to implement various embodiments may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (corresponding to one or more of the interfaces 590 or 790) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, an apparatus to establish secure communications includes a processor component; a verifying component for execution by the processor component to verify a received link attestation credential to verify an ability to form a secure pipeline, and to signal an application routine with an indication of a result of the verification by the verifying component; and a hash component for execution by the processor component to generate a return hash of a return signature associated with the application routine that indicates that the application routine has also verified the link attestation credential to form the secure pipeline with the application routine.

In Example 2, which includes the subject matter of Example 1, the apparatus may include an interface to couple the processor component to a network to receive the link attestation credential from a server, the link attestation credential to attest to the ability of the server to form the secure pipeline, and verification of the link attestation credential to verify the ability of the server to form the secure pipeline.

In Example 3, which includes the subject matter of any of Examples 1-2, the verifying component may verify the link attestation credential using a link verification credential associated with the link attestation credential, and may provide at least one of the link attestation credential or the link verification credential to the application routine to enable the application routine to verify the link attestation credential.

In Example 4, which includes the subject matter of any of Examples 1-3, the hash component may generate the return signature based on an indication of a result of the verification by the application routine.

In Example 5, which includes the subject matter of any of Examples 1-4, the hash component may generate the return signature from the link attestation credential as provided to the hash component by the application routine.

In Example 6, which includes the subject matter of any of Examples 1-5, the hash component may generate the return signature additionally from at least one of an environment attestation credential to attest to a server with which the secure pipeline is formed that the application routine is executed in a secure processing environment provided by the processor component or data indicative of a context of execution of the application routine, the data comprising at least one of an indication of a size of the application routine or a hash of a portion of the application routine.

In Example 7, which includes the subject matter of any of Examples 1-6, the hash component may provide the return signature to the application routine in response to a request for the return signature from the application routine.

In Example 8, which includes the subject matter of any of Examples 1-7, the apparatus may include a storage, and a control routine for execution by the processor component to allocate a portion of the storage to the application routine to provide a secure processing environment for execution of the application routine by the processor component.

In Example 9, which includes the subject matter of any of Examples 1-8, the apparatus may include another processor component, a storage, and a control routine for execution by the processor component to cooperate with the other processor component to allocate a portion of the storage to the application routine to provide a secure processing environment for execution of the application routine by the other processor component.

In Example 10, which includes the subject matter of any of Examples 1-9, the apparatus may include the application routine, the application routine comprising another verifying component to verify a signed hash as generated by a server with which the secure pipeline is formed from the return hash using the link attestation credential as received by the application routine to form a chain of trust at an application level between the server and the application routine in addition to the pipeline formed therebetween.

In Example 11, which includes the subject matter of any of Examples 1-10, the apparatus may include a signature component to transmit the return signature to the server based on the verification of the signed hash to indicate to the server that the application routine has verified the signed hash to form the chain of trust at the application level.

In Example 12, an apparatus to establish secure communications includes a processor component; an initiating component for execution by the processor component to transmit a link attestation credential to a client device to attest to an ability form a secure pipeline with the client device; and a signing component for execution by the processor component to sign a return hash received from the client device with the link attestation credential to generate a signed hash, and to transmit the signed hash to the client device to attest to an ability to form a chain of trust with an application routine of the client device at an application level.

In Example 13, which includes the subject matter of Example 12, the apparatus may include an interface to couple the processor component to a network to receive the return hash from the client device.

In Example 14, which includes the subject matter of any of Examples 12-13, the apparatus may include a verifying component for execution by the processor component to generate another return hash from a return signature received from the client device and to compare the return hash to the other return hash to verify the return hash as generated from the return signature.

In Example 15, which includes the subject matter of any of Examples 12-14, the verifying component may verify the return signature using an environment verification credential associated with an environment attestation credential used by the client device to generate the return signature to verify execution of the application routine within a secure processing environment of the client device to form the chain of trust.

In Example 16, a computing-implemented method for establishing secure communications includes verifying a link attestation credential received via a network to verify an ability to form a secure pipeline through the network, signaling an application routine with an indication of a result of the verification, and generating a return hash of a return signature associated with the application routine that indicates that the application routine has also verified the link attestation credential to form the secure pipeline with the application routine.

In Example 17, which includes the subject matter of Example 16, the method may include verifying the link attestation credential using a link verification credential associated with the link attestation credential, and providing at least one of the link attestation credential or the link verification credential to the application routine to enable the application routine to verify the link attestation credential.

In Example 18, which includes the subject matter of any of Examples 16-17, the method may include generating the return signature based on an indication of a result of the verification by the application routine.

In Example 19, which includes the subject matter of any of Examples 16-18, the method may include generating the return signature from the link attestation credential as provided to the hash component by the application routine.

In Example 20, which includes the subject matter of any of Examples 16-19, the method may include generating the return signature additionally from at least one of an environment attestation credential to attest to a server with which the secure pipeline is formed that the application routine is executed in a secure processing environment provided by the processor component or data indicative of a context of execution of the application routine, the data comprising at least one of an indication of a size of the application routine or a hash of a portion of the application routine.

In Example 21, which includes the subject matter of any of Examples 16-20, the method may include providing the return signature to the application routine in response to a request for the return signature from the application routine.

In Example 22, which includes the subject matter of any of Examples 16-21, the method may include executing the application routine in a secure processing environment.

In Example 23, which includes the subject matter of any of Examples 16-22, the method may include allocating a portion of a storage to the application routine for execution of the application routine, and restricting access to the portion of the storage from access by another routine.

In Example 24, which includes the subject matter of any of Examples 16-23, the method may include verifying a signed hash as generated by a server with which the secure pipeline is formed from the return hash using the link attestation credential as received by the application routine to form a chain of trust at an application level between the server and the application routine in addition to the pipeline formed therebetween.

In Example 25, which includes the subject matter of any of Examples 16-24, the method may include transmitting the return signature to the server based on the verification of the signed hash to indicate to the server that the application routine has verified the signed hash to form the chain of trust at the application level.

In Example 26, at least one machine-readable storage medium includes instructions that when executed by a computing device, cause the computing device to verify a link attestation credential received via a network coupled to the computing device to verify an ability to form a secure pipeline through the network, signal an application routine executed on the computing device with an indication of a result of the verification, and generate a return hash of a return signature associated with the application routine that indicates that the application routine has also verified the link attestation credential to form the secure pipeline with the application routine.

In Example 27, which includes the subject matter of Example 26, the computing device may be caused to verify the link attestation credential using a link verification credential associated with the link attestation credential, and provide at least one of the link attestation credential or the link verification credential to the application routine to enable the application routine to verify the link attestation credential.

In Example 28, which includes the subject matter of any of Examples 26-27, the computing device may be caused to generate the return signature based on an indication of a result of the verification by the application routine.

In Example 29, which includes the subject matter of any of Examples 26-28, the computing device may be caused to generate the return signature from the link attestation credential as provided to the hash component by the application routine.

In Example 30, which includes the subject matter of any of Examples 26-29, the computing device may be caused to generate the return signature additionally from at least one of an environment attestation credential to attest to a server with which the secure pipeline is formed that the application routine is executed in a secure processing environment provided by the processor component or data indicative of a context of execution of the application routine, the data comprising at least one of an indication of a size of the application routine or a hash of a portion of the application routine.

In Example 31, which includes the subject matter of any of Examples 26-30, the computing device may be caused to provide the return signature to the application routine in response to a request for the return signature from the application routine.

In Example 32, which includes the subject matter of any of Examples 26-31, the computing device may be caused to execute the application routine in a secure processing environment.

In Example 33, which includes the subject matter of any of Examples 26-32, the computing device may be caused to allocate a portion of a storage to the application routine for execution of the application routine, and restrict access to the portion of the storage from access by another routine.

In Example 34, which includes the subject matter of any of Examples 26-33, the computing device may be caused to verify a signed hash as generated by a server with which the secure pipeline is formed from the return hash using the link attestation credential as received by the application routine to form a chain of trust at an application level between the server and the application routine in addition to the pipeline formed therebetween.

In Example 35, which includes the subject matter of any of Examples 26-34, the computing device may be caused to transmit the return signature to the server based on the verification of the signed hash to indicate to the server that the application routine has verified the signed hash to form the chain of trust at the application level.

In Example 36, an apparatus to receive commands includes means for verifying a link attestation credential received via a network to verify an ability to form a secure pipeline through the network, signaling an application routine with an indication of a result of the verification, and generating a return hash of a return signature associated with the application routine that indicates that the application routine has also verified the link attestation credential to form the secure pipeline with the application routine.

In Example 37, which includes the subject matter of Example 36, the apparatus may include means for verifying the link attestation credential using a link verification credential associated with the link attestation credential, and providing at least one of the link attestation credential or the link verification credential to the application routine to enable the application routine to verify the link attestation credential.

In Example 38, which includes the subject matter of any of Examples 36-37, the apparatus may include means for generating the return signature based on an indication of a result of the verification by the application routine.

In Example 39, which includes the subject matter of any of Examples 36-38, the apparatus may include means for generating the return signature from the link attestation credential as provided to the hash component by the application routine.

In Example 40, which includes the subject matter of any of Examples 36-39, the apparatus may include means for generating the return signature additionally from at least one of an environment attestation credential to attest to a server with which the secure pipeline is formed that the application routine is executed in a secure processing environment provided by the processor component or data indicative of a context of execution of the application routine, the data comprising at least one of an indication of a size of the application routine or a hash of a portion of the application routine.

In Example 41, which includes the subject matter of any of Examples 36-40, the apparatus may include means for providing the return signature to the application routine in response to a request for the return signature from the application routine.

In Example 42, which includes the subject matter of any of Examples 36-41, the apparatus may include means for executing the application routine in a secure processing environment.

In Example 43, which includes the subject matter of any of Examples 36-42, the apparatus may include means for allocating a portion of a storage to the application routine for execution of the application routine, and restricting access to the portion of the storage from access by another routine.

In Example 44, which includes the subject matter of any of Examples 36-43, the apparatus may include means for verifying a signed hash as generated by a server with which the secure pipeline is formed from the return hash using the link attestation credential as received by the application routine to form a chain of trust at an application level between the server and the application routine in addition to the pipeline formed therebetween.

In Example 45, which includes the subject matter of any of Examples 36-44, the apparatus may include means for transmitting the return signature to the server based on the verification of the signed hash to indicate to the server that the application routine has verified the signed hash to form the chain of trust at the application level.

In Example 46, at least one machine-readable storage medium may include instructions that when executed by a computing device, cause the computing device to perform any of the above.

In Example 47, an apparatus to assign processor component cores to perform task portions may include means for performing any of the above.

The invention claimed is:

1. An apparatus to establish secure communications comprising:
   a computing device comprising a first processor component and a second processor component, the second processor component within a secure processing environment and the first processor component external to the secure processing environment;
   a verifying component for execution by the second processor component to verify a received link attestation credential to verify an ability of a server to form a secure pipeline through a network, the link attestation credential verified with a link verification credential, and to signal an application routine with an indication of a result of the verification by the verifying component;
   the application routine for execution by the first processor component to verify a second received link attestation credential to verify the ability of the server to form the secure pipeline through the network, the link attestation credential verified with the link verification credential, and to signal a hash component for generation of a return hash;
   the hash component for execution by the second processor component to generate a return signature associated with the application routine and the return hash of the return signature that indicates that the application routine has also verified the link attestation credential to form the secure pipeline between the server and the application routine, the return signature generated from the link attestation credential and an environment attestation credential to attest to the server with which the secure pipeline is formed that the application routine is executed in the secure processing environment by the second processor component; and
   the application routine for execution by the first processor component to signal for transmission of the return hash to the server, verify a signed hash received from the server with the link verification credential and the return hash, and signal for transmission of the return signature to the server, wherein the server verifies the return signature based on a comparison of the return hash to a second return hash generated by the server.

2. The apparatus of claim 1, comprising an interface to couple the first processor component to a network to receive the link attestation credential from the server, the link attestation credential to attest to the ability of the server to form the secure pipeline, and verification of the link attestation credential to verify the ability of the server to form the secure pipeline.

3. The apparatus of claim 1, the link attestation credential provided to the hash component by the application routine.

4. The apparatus of claim 1, the hash component to generate the return signature additionally from data indicative of a context of execution of the application routine, the data comprising at least one of an indication of a size of the application routine or a hash of a portion of the application routine.

5. The apparatus of claim 1, comprising:
   a storage; and
   a control routine for execution by the second processor component to allocate a portion of the storage to the application routine to provide the secure processing environment for execution of the application routine by the second processor component.

6. The apparatus of claim 1, comprising:
   a storage; and
   a control routine for execution by the first processor component to cooperate with the second processor component to allocate a portion of the storage to the application routine to provide the secure processing environment for execution of the application routine by the second processor component.

7. The apparatus of claim 1, comprising the application routine, the application routine comprising another verifying component to verify the signed hash as generated by the server with which the secure pipeline is formed from the return hash using the link attestation credential as received by the application routine to form a chain of trust at an application level between the server and the application routine in addition to the secure pipeline formed therebetween.

8. A computing-implemented method for establishing secure communications comprising:
- verifying, with a controller processor component of a computing device, a link attestation credential received via a network from a server to verify an ability of the server to form a secure pipeline through the network, the link attestation credential verified with a link verification credential, the computing device comprising a main processor component and the controller processor component, the controller processor component within a secure processing environment and the main processor component external to the secure processing environment;
- signaling an application routine executing on the main processor component with an indication of a result of the verification;
- verifying, with the application routine, a copy of the link attestation credential received via the network from the server to independently verify the ability of the server to form the secure pipeline through the network, the link attestation credential verified with the link verification credential;
- signaling, with the application routine, the controller processing component to generate a return hash;
- generating, with the controller processing component, a return signature associated with the application routine and the return hash of the return signature that indicates that the application routine has also verified the link attestation credential to form the secure pipeline between the server and the application routine, the return signature generated from the link attestation credential and an environment attestation credential to attest to the server with which the secure pipeline is formed that the application routine is executed in the secure processing environment by the controller processor component;
- signaling, with the application routine, for transmission of the return hash to the server:
- verifying, with the application routine, a signed hash received via the network from the server with the link verification credential and the return hash; and
- signaling, with the application routine, for transmission of the return signature to the server, wherein the server verifies the return signature based on a comparison of the return hash to a second return hash generated by the server.

9. The computer-implemented method of claim 8, comprising:
- providing at least one of the link attestation credential or the link verification credential to the application routine to enable the application routine to verify the link attestation credential.

10. The computer-implemented method of claim 8, comprising generating the return signature based on an indication of a result of the verification by the application routine.

11. The computer-implemented method of claim 8, comprising executing at least a portion of the application routine in the secure processing environment with the controller processor component.

12. The computer-implemented method of claim 11, comprising:
- allocating a portion of a storage to the application routine for execution of the application routine; and
- restricting access to the portion of the storage from access by another routine.

13. The computer-implemented method of claim 11, comprising verifying the signed hash as generated by the server with which the secure pipeline is formed from the return hash using the link attestation credential as received by the application routine to form a chain of trust at an application level between the server and the application routine in addition to the secure pipeline formed therebetween.

14. The computer-implemented method of claim 13, comprising transmitting the return signature to the server based on the verification of the signed hash to indicate to the server that the application routine has verified the signed hash to form the chain of trust at the application level.

15. The computer-implemented method of claim 8, the link attestation credential provided by the application routine.

16. The computer-implemented method of claim 8, comprising generating the return signature additionally from data indicative of a context of execution of the application routine, the data comprising at least one of an indication of a size of the application routine or a hash of a portion of the application routine.

17. At least one non-transitory machine-readable storage medium comprising instructions that when executed by a computing device, cause the computing device to:
- verify, with a controller processor component of a computing device, a link attestation credential received via a network from a server to verify an ability of the server to form a secure pipeline through the network, the link attestation credential verified with a link verification credential, the computing device comprising a main processor component and the controller processor component, the controller processor component within a secure processing environment and the main processor component external to the secure processing environment;
- signal an application routine executing on the main processor component with an indication of a result of the verification;
- verify, with the application routine, a copy of the link attestation credential received via the network from the server to independently verify the ability of the server to form the secure pipeline through the network, the link attestation credential verified with the link verification credential;
- signal, with the application routine, the controller processing component to generate a return hash;
- generate, with the controller processing component, a return signature associated with the application routine and the return hash of the return signature that indicates that the application routine has also verified the link attestation credential to form the secure pipeline between the server and the application routine, the return signature generated from the link attestation credential and an environment attestation credential to attest to the server with which the secure pipeline is formed that the application routine is executed in the secure processing environment by the controller processor component;
- signal, with the application routine, for transmission of the return hash to the server:
- verify, with the application routine, a signed hash received via the network from the server with the link verification credential and the return hash; and
- signal, with the application routine, for transmission of the return signature to the server, wherein the server verifies the return signature based on a comparison of the return hash to a second return hash generated by the server.

18. The at least one non-transitory machine-readable storage medium of claim 17, the computing device caused to:

provide at least one of the link attestation credential or the link verification credential to the application routine to enable the application routine to verify the link attestation credential.

19. The at least one non-transitory machine-readable storage medium of claim 17, the computing device caused to generate the return signature based on an indication of a result of the verification by the application routine.

20. The at least one non-transitory machine-readable storage medium of claim 17, the link attestation credential provided by the application routine.

21. The at least one non-transitory machine-readable storage medium of claim 17, the computing device caused to generate the return signature additionally from data indicative of a context of execution of the application routine, the data comprising at least one of an indication of a size of the application routine or a hash of a portion of the application routine.

22. The at least one non-transitory machine-readable storage medium of claim 17, the computing device caused to provide the return signature to the application routine in response to a request for the return signature from the application routine.

23. The at least one non-transitory machine-readable storage medium of claim 17, the computing device caused to execute at least a portion of the application routine in the secure processing environment with the controller processor component.

24. The at least one non-transitory machine-readable storage medium of claim 23, the computing device caused to verify the signed hash as generated by the server with which the secure pipeline is formed from the return hash using the link attestation credential as received by the application routine to form a chain of trust at an application level between the server and the application routine in addition to the secure pipeline formed therebetween.

25. The at least one non-transitory machine-readable storage medium of claim 24, the computing device caused to transmit the return signature to the server based on the verification of the signed hash to indicate to the server that the application routine has verified the signed hash to form the chain of trust at the application level.

* * * * *

UNITED STATES PATENT AND TRADEMARK OFFICE
CERTIFICATE OF CORRECTION

PATENT NO. : 10,187,385 B2  
APPLICATION NO. : 14/369219  
DATED : January 22, 2019  
INVENTOR(S) : Adi Shaliv and Jesse Walker Page 1 of 1

It is certified that error appears in the above-identified patent and that said Letters Patent is hereby corrected as shown below:

In the Claims

Column 29, Line 38, replace "the return hash to the server:" with -- the return hash to the server; --.

Column 30, Line 59, replace "the return hash to the server:" with -- the return hash to the server; --.

Signed and Sealed this  
Third Day of March, 2020

Andrei Iancu  
*Director of the United States Patent and Trademark Office*